United States Patent [19]

Bellafiore

[11] Patent Number: 4,617,429

[45] Date of Patent: Oct. 14, 1986

[54] HEARING AID

[76] Inventor: Gaspare Bellafiore, 58 Stevens Rd., Cranston, R.I. 02910

[21] Appl. No.: 698,072

[22] Filed: Feb. 4, 1985

[51] Int. Cl.4 .................... H04R 25/02; B29C 33/40

[52] U.S. Cl. .................... 179/107 E; 264/222; 381/69

[58] Field of Search .................... 179/107 E, 107 R; 264/222; 381/69

[56] References Cited

U.S. PATENT DOCUMENTS

| | | | |
|---|---|---|---|
| 2,950,357 | 8/1960 | Mitchell et al. | 179/107 E |
| 3,345,737 | 10/1967 | Gordon | 179/107 E |
| 3,451,502 | 6/1969 | Branch et al. | 179/107 E |
| 3,513,269 | 5/1970 | Wilson | 264/222 |
| 4,471,490 | 9/1984 | Bellafiore | 381/69 |

FOREIGN PATENT DOCUMENTS

| | | | |
|---|---|---|---|
| 1274658 | 8/1968 | Fed. Rep. of Germany | 179/107 E |

*Primary Examiner*—Gene Z. Rubinson

*Assistant Examiner*—Danita R. Byrd

*Attorney, Agent, or Firm*—Salter & Michaelson

[57] ABSTRACT

A hearing aid including a plug that is tailored to snugly fit into the auditory canal of the user's ear, and that has a preshaped component assembly embedded therein, the component assembly comprising shell-like members that are interconnected to each other and that have the electrical components of the hearing aid mounted therein, the members being prearranged to achieve a configuration generally similar to the shape of the plug and being secured in end-to-end position for mounting interiorly in a negative impression in a mold as formed from the user's auditory canal, the assembled members being embedded in the negative impression in the mold upon pouring of a quick setting plastic material into the negative impression, thereby permanently fixing the preshaped assembly in the plug that is formed as the quick setting plastic material hardens around the assembled preshaped members.

7 Claims, 10 Drawing Figures

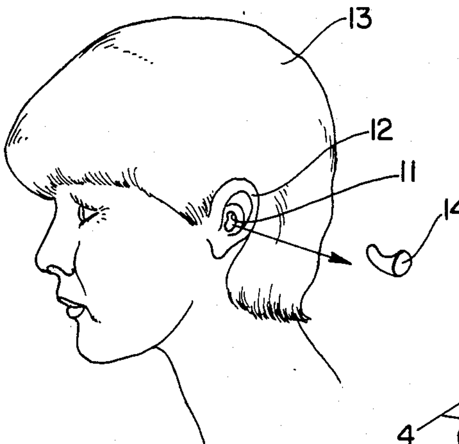
FIG. 1
FIG. 2
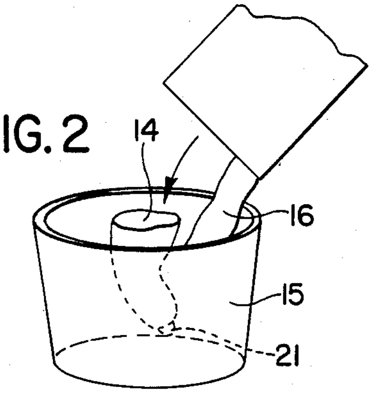
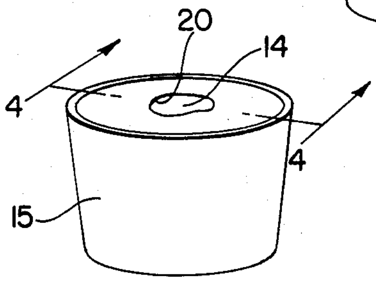
FIG. 3
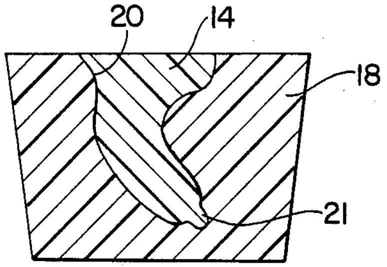
FIG. 4
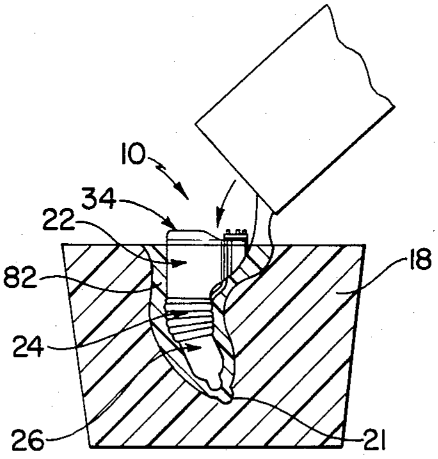
FIG. 5
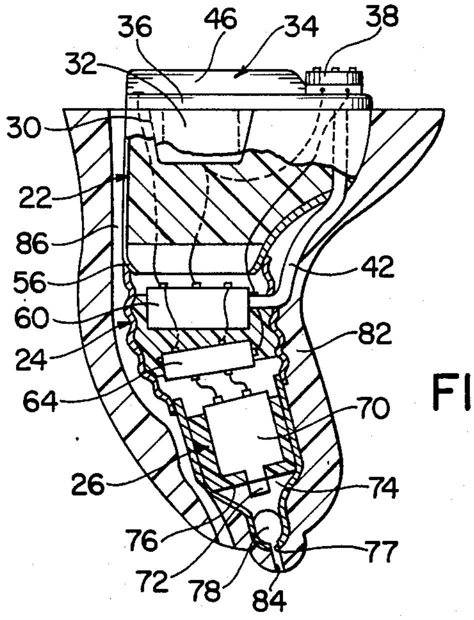
FIG. 6

HEARING AID

BACKGROUND OF THE INVENTION

The present invention relates to a hearing aid of the type as disclosed in applicant's prior U.S. Pat. No. 4,471,490, and includes a miniaturized ear plug for use therewith that has a shape and configuration that is tailored to the shape and configuration of the user's auditory canal so that the ear plug can be inserted therein for a comfortable fit, the concha portion of the user's ear thereby being unobstructed to act as a focal point for collecting sound waves and directing them into a microphone of the hearing aid as located in the ear plug thereof.

The component parts of applicant's invention correspond generally to the parts as shown in applicant's prior U.S. Pat. No. 4,471,490, wherein a battery is located in a battery compartment as mounted in a cavity formed in an outer portion of the ear plug. A microphone that is exposed for receiving sound transmits the sound waves to an amplifier as located in the ear plug, which in turn amplifies the sound waves for transmission to a transducer-receiver located in the inner portion of the ear plug. The transducer-receiver communicates with a sound tube that in turn has access to the auditory canal of the user's ear, whereupon the amplified sound is transmitted by the sound tube into the auditory canal of the user's ear in the well-known manner. As illustrated in U.S. Pat. No. 4,471,490, the components of the ear plug are all electrically interconnected to provide for the transmission of the sound waves and amplified sound to the auditory canal of the user.

Although the hearing aid as illustrated in U.S. Pat. No. 4,471,490 has provided an improved device over the prior known constructions, considerable care is required in assembling the component parts within the body portion or plug of the hearing aid. Further, because the configuration of the body portion of the prior known plug type of hearing aid is generally fashioned as to the shape and configuration from the shape and configuration of the user's ear, it was sometimes difficult to properly assemble the component parts therein. Because of the considerable handling required in the assembly of the components, the controls and wiring for the hearing aid could become mechanically inoperative, and quality of sound could be effected unless great care and attention were given to the assembly of the component parts.

The present invention provides a hearing aid ear plug and method of assembly of the component parts therein that avoids the problems experienced heretofore, and as will be described hereinafter, the improvement herein further relates to the manner in which the hearing aid component parts are assembled and preshaped for insertion into a mold that is cast from the user's auditory canal, thereby providing for a tailored fit of the finished ear plug into the user's auditory canal and further providing for better fidelity of sound as transmitted to the auditory canal of the user.

SUMMARY OF THE INVENTION

The present invention relates to a miniaturized hearing aid that includes an ear plug that is inserted directly into the auditory canal of the user and that contains all of the components of the hearing aid therein, thereby eliminating the use of external wiring and sound tubes and the conventional behind-the-ear housing, although as hereinafter mentioned, the concept of the subject invention for assembling the component parts of the invention may also be utilized in those ear plugs that are employed with a behind-the-ear housing.

The component parts of the miniaturized hearing aid of the subject invention that are located in the ear plug are preassembled into an outer member, an intermediate member, and an inner member, the members thereafter being interconnected so as to provide for communication and interconnection of the components. The method embodied in the assembly of the components into the finished ear plug provides for mounting of the components in the appropriate member and then fixing of the components therein by the use of an insulating silicone material. Thereafter, the components are loosely interconnected so as to be movable relative to each other into a configuration that approximates that of the interior of the user's ear. In this connection, a negative impression is obtained from the user's auditory canal in the form of a mold cavity, the interconnected members in which the components are fixed then being preshaped in accordance with the configuration of the mold cavity. With the members preshaped, they are then located within the mold cavity, and a quick setting acrylic material is poured into the cavity and around the preshaped assembly. A finished and assembled ear plug is thus obtained in which all of the controls of the hearing aid are located, the ear plug being snugly received within the confines of the auditory canal of the user in comfortable fitting relation to leave the concha portion of the user's ear exposed for collecting the sound waves and transmitting them to a microphone as fixed in the ear plug.

Accordingly, it is an object of the present invention to provide a hearing aid having a plug in which a plurality of preshaped and interconnected members are located to provide an assembly that is resistant to shock and that ensures soundproofing of the sound tube within the hearing aid so as to further provide for fidelity of sound as transmitted to the auditory canal of the user.

A further object is to provide an ear plug having a plurality of members that are interconnected and preshaped so as to enable them to be more easily fitted into a correspondingly shaped ear plug.

A still further object is to provide an ear plug having the components thereof embedded within members that are interfitted together, the assembly as inserted into a mold cavity being fixed in the assembled position by a material that is poured therearound for quick setting.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a view illustrating the manner in which a positive impression is obtained from the auditory canal of a user;

FIG. 2 shows the positive impression as located in a mold from which a negative impression is obtained;

FIG. 3 illustrates the mold with the positive impression as fixed therein and prior to the removal thereof to form the cavity;

FIG. 4 is a sectional view taken along FIG. 4—4 in FIG. 3.

FIG. 5 illustrates the manner in which the assembled members of the ear plug are placed in the mold cavity and embedded in an external shell that is poured therearound to form the finished ear plug;

FIG. 6 is a sectional view with parts shown in elevation of the finished ear plug as formed with the external shell therearound;

DESCRIPTION OF THE INVENTION

Figure 7:
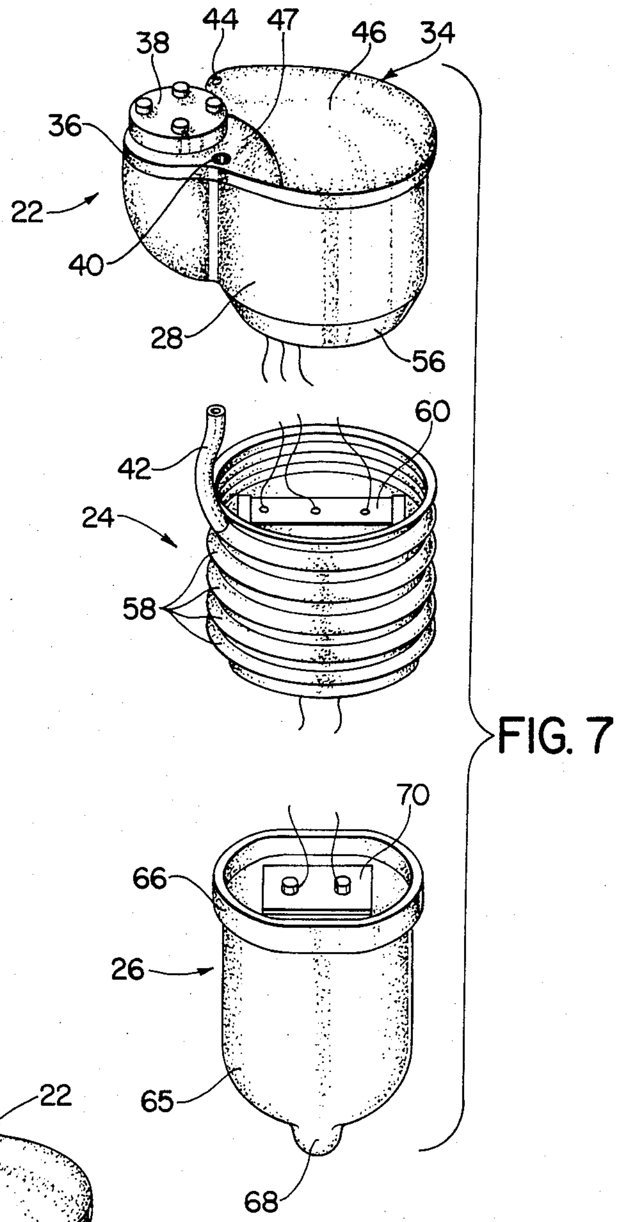
FIG. 7 is an exploded perspective view illustrating the individual members that define the ear plug assembly and in which the component parts of the hearing aid are fixed.
Figure 8:
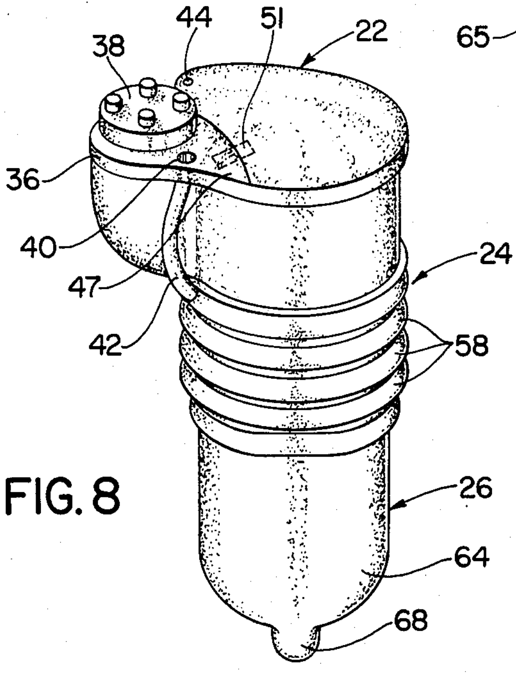
FIG. 8 is a perspective view illustrating the members as located in the interconnected position and prior to the movement thereof to a preshaped configuration that corresponds to the configuration of the auditory canal of the user.

Referring now to the drawings, and particularly to FIGS. 1–5, the steps embodied in the assembly of the individual components that are included in the subject invention are illustrated, and as shown in FIGS. 6, 7, and 8, the components and the members in which they are located are shown, and reference will be made to the relationship of the components and members in the following description.

Referring first to FIG. 6, the hearing aid as embodied in the subject invention is illustrated and is generally indicated at 10. As will hereinafter be described, the hearing aid 10 is comprised of a plurality of members in which well known hearing aid components are fixed, the members being eventually embedded in a shell, the external configuration of which is obtained from the configuration of the auditory canal of the user. The external configuration of the hearing aid is determined by first obtaining a positive impression of the auditory canal 11 formed in the ear 12 of the user 13, shown in FIG. 1, which involves introducing a quick setting material of any conventional type such as used by dentists into the auditory canal 11 of the user 12 to obtain the precise configuration thereof in the form of a positive impression 14. After the material from which the positive impression 14 is formed sets, the positive impression 14 is removed from the auditory canal 11 of the patient's ear 12. Thereafter, the positive impression 14 is placed in a mold container 15, and the suitable quick setting dental material indicated at 16 is introduced therein to embed the positive impression 14 in the container 15. As illustrated in FIG. 3, the material 16, after setting, forms a mold 18 that is removable from the container 15 and upon extracting of the positive impression 12 from the mold 18, a cavity or negative impression 20 is formed in the mold 18 that is identical in configuration to the auditory canal 11 of the user. As shown in FIG. 2, a projection 21 is added to the reduced inner end of the positive impression that will form a corresponding depression in the negative impression 20, the purpose of which will be described hereinafter. As will be described below and illustrated in FIG. 5, the finished hearing aid 10 is assembled from preformed members that are interfitted together and shaped so as to be received within the negative impression 20, whereupon upon embedding of the preformed members in an acrylic material, the finished ear plug is formed. However, before the final step of obtaining the complete ear plug is described, reference will be made hereinafter to the various components and to the members in which they are inserted.

Figure 9:
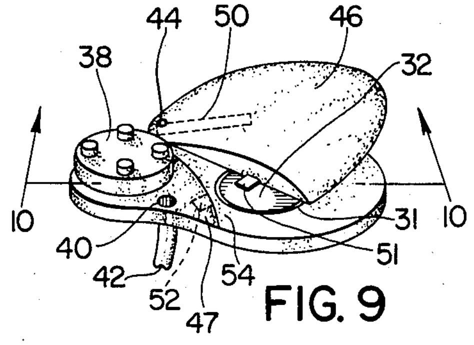
FIG. 9 is a perspective view of the cover plate of the outer member of the assembly.
Figure 10:
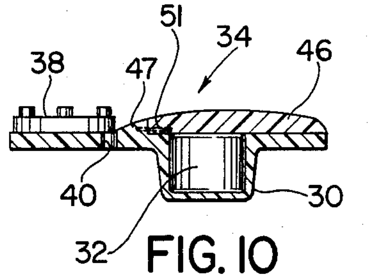
FIG. 10 is a sectional view of the cover plate as located on the outer member of the assembly.

Referring now to FIGS. 6–10, the various components that are incorporated in the hearing aid 10, and the members in which the components are inserted, are illustrated in detail. The subject invention is unique in that each of the components that is incorporated in the hearing aid 10 is separately assembled in a member, and fixed therein. The members are then assembled together and located in a prescribed configuration so as to be received in the negative impression 20. As shown in FIGS. 6, 7, and 8, the assembled members include an outer member generally indicated at 22, an intermediate member generally indicated at 24, and an inner member generally indicated at 26. As shown more clearly in the assembled position of the members 22, 24, and 26 in FIG. 6, the outer member 22 includes a body portion 28 which is hollow in construction for receiving a battery compartment shown in FIG. 10 at 30 in which a battery 32 is inserted. Mounted on the body portion 28 is an upper plate generally indicated at 34 which, as illustrated in FIGS. 9 and 10, includes a base plate 36 on which a volume control member 38 is rotatably mounted. As will be described, the volume control member 38 is electrically connected to an amplifier for controlling the volume of sound transmitted to the user. Formed in the base plate 36 is a microphone opening 40 that also extends into the microphone through a microphone tube 42. Formed on the underside of the upper plate 34 is the battery compartment 30 which receives the battery 32 therein. Mounted for pivotal movement on the upper plate 34 at 44 is a cover plate 46 that has a contact 50 joined thereto through the pivot connection 44 and that engages the battery 32 to provide a continuous circuit to the hearing aid components as will be described herein below. In order to positively secure the cover plate 46 in position over the battery 32, a latch finger 51 is joined thereto and is received in an opening 52 as formed in the reduced wall 54 that is formed in a built-up portion 47 that extends upwardly from the upper plate 34 and that is located adjacent to the volume control member 30. It is seen that the pivoted cover plate 46 is moved into the locked position over the battery 32 as the finger 50 is slidably inserted into the slot 52 that is formed in the reduced wall 54. The outer member 22 is also designed to interfit with the inner member 24 and for this purpose is provided with an upwardly tapered lower end portion 56 that is shaped and proportioned for interfitting with the uppermost end of the intermediate member 24.

As shown in FIG. 6, the intermediate member 24 is tubular in construction and is defined by a body portion that includes a plurality of annular corrogations 58 that provide for flexibility of the intermediate member in the manipulation thereof to locate the assembled members in a preshaped configuration. As more clearly illustrated in FIG. 6, a microphone 60 is fixed in the intermediate member 24 and communicates with the microphone opening 40 through the tube 42. Also located within the intermediate member 24 is an amplifier 64 that is electrically connected to the microphone 60, the battery 32, and the volume control 38. As further shown in FIG. 6, the microphone 60 is electrically connected to the battery 32 through suitable wiring. It is understood that the microphone 60 and amplifier 64 are well known components in hearing aid constructions and the details thereof do not form any part of the subject invention.

Referring again to FIGS. 6 and 7, the inner member 26 is shown including a body portion 65 that terminates at the outer end thereof in a peripheral rim 66. The lower end of the body portion is substantially rounded, and has a bulbous type projection 68 formed on the bottom thereof, the purpose of which will hereinafter be described. Fixed in the inner member 26 is a transducer-receiver 70 of well known construction and operation that is electrically connected to the amplifier 64. A sound tube 72 communicates with the lowermost end of the receiver 70 and projects into a compartment 74 that is formed by a wall 76 and the lowermost end of the body portion 65. As further illustrated in FIG. 6, the projection 68 is substantially hollow to define an enlarged passage that communicates with the chamber 74.

As illustrated in FIG. 6, the components of the hearing aid, that is the battery compartment 30 and the battery 32 that is received therein, the microphone 60, amplifier 64, and the receiver-transducer 70, are all preassembled in their individual members prior to the assembly of the members to the position shown in FIG. 8. In this connection, a quick setting silicone material is poured into the members to fix the components in place therein. It is also seen that the silicone material that is poured into the outer member 22 can be formed with a cavity for receiving the battery compartment 30 of the upper plate 34 therein. The microphone 60 and the amplifier 64 are fixed in place in spaced relation in the intermediate member 24 by the silicone material and similarly, the receiver 70 is embedded in the inner member 26, the terminals for the receiver being exposed for securement of the electrical wiring thereto as illustrated in FIG. 7. In order to form the chamber 74 in the inner member 26, a film as defined by the inner wall 76 is fixed in place within the inner member prior to introducing the silicone material therein, thereby embedding the receiver 70 within the inner member. As shown in FIG. 6, the wall 76 is provided with an opening through which the sound tube 72 extends as it projects into the chamber 74. The silicone material as used to fix the components in place also acts as an insulating medium to insure greater fidelity of sound received in the auditory canal of the user.

With the various components secured in place within the members 22, 24, and 26, the members are preassembled in loose fitting relation by interconnecting the outer ends thereof as shown in FIG. 8. In the position of the members as assembled, they are substantially aligned in coaxial relation. However, the negative impression 20 as formed in the mold 18 has a configuration that corresponds to that of the auditory canal of the user, and in order to move the members to a position that approximates the configuration of the auditory canal of the user, the members are initially loosely connected from end-to-end. Thereafter, the members are flexed or moved relative to each other to approximate the configuration of the negative impression as formed in the mold 18. Recognizing that the members 22, 24, and 26 cannot be shaped precisely in the configuration of the negative impression 20 as formed in the mold 18, they nevertheless can be moved in a manner that will permit them to be more centrally received in the negative impression. Thus, with the members assembled as shown in FIG. 8, they are manipulated and moved to the configuration shown in FIG. 6. It is seen that the flexibility of the intermediate member 24 permits the inner member 26 and outer member 22 to be moved relative thereto to the position as shown in FIG. 6, wherein the axis of the members are no longer coincident. With the members located in the prescribed position, they are fixed in place relative to each other by applying a suitable adhesive around the annular joints or connections thereof. It is understood, of course, that the electrical wiring between the components has been accomplished before the members have been finally assembled and fixed in place since access to the interior of the members is no longer available.

With the member preassembled and located in the configuration as required, the assembly is then placed within the negative impression 20 of the mold 18 as shown in FIG. 5. It is also seen that the dimension of the members 22, 24, and 26 has been preestablished so that when the assembly is placed within the negative impression 20, an annular space is created around the assembly. In the final assembly step, an acrylic material is poured into the negative impression 20 of the mold 18 with the assembled components retained in a slightly elevated position in the mold to permit the material to flow around the projection 68 and into the depression as formed at the bottom of the cavity. Prior to the assembly of the members, a hole 77 is formed in the projection 68 and a paraffin material indicated at 78 is forced therein to prevent the acrylic material from entering into the chamber 74 during the pouring thereof.

The assembly as defined by the members 22, 24, and 26, is thus incapsulated in an outer shell 82 as formed by the quick setting acrylic plastic material. The acrylic material forms around the assembly and hardens to define the plug of the hearing aid, the configuration of which is designed to snugly fit within the patient's ear from which the positive impression 14 was made. As further shown in FIG. 5, the outer plate 22 that is located on the outer member 22 extends above the mold 18 so as to be pivotally movable as required. After the acrylic material has hardened to form the outer shell 82, the hearing aid plug is removed from the mold 18, and a passage 84 drilled through the lower end to communicate with the passage 68. The paraffin 78 is then removed from the passage 68 by applying a low flame to the end of the plug, wherein the paraffin melts and drips out of the hole 77 and passage 84. Thereafter, the plug is buffed and polished to a finished form. As further illustrated in FIG. 6, access of sound from the sound tube 72 to the auditory canal of the user is provided by the hole 77 as formed in the projection 68 and the passage 84 as formed by the mold and located at the innermost end of the shell 82.

Because users of hearing aid devices have different sound responses, it is sometimes necessary to compensate for the patient's need in receiving sound; and this may be accomplished by altering the so-called sound response curve. The present invention obtains this result by the forming of a sound vent tube 86 along the length of the assembled members 22, 24, and 26, and as provided for by the pouring of the acrylic material therearound. Thus, an elongated cylindrical member (not shown) is mounted in engagement with the outer surfaces of the members during the pouring of the acrylic material therearound and is thereafter removed from the assembly to form the vent tube 86. The vent tube 86 extends longitudinally through the shell so as to have access to the auditory canal and acts to vary the sound response requirements of the user, depending upon his particular needs.

It is understood that by assembling the members in the manner as described, an exact fitting of the hearing aid can be accomplished, and the components of the hearing aid can be preassembled to reduce the time required for the manufacture of the unit. The preassembling of the components in the manner as described also insures that the components will be resistant to shock in use, thereby substantially eliminating the shorting of the wiring therebetween. Further, by forming the members in a manner that enables them to be preshaped to conform to the negative impression as formed from the auditory canal of the user's ear, the assembly can be easily and quickly placed into the negative impression of the mold, and the shell poured therearound to accomplish the exact and precise fit required for comfortable and effective use.

Although not illustrated, it is understood that the method of manufacture of the hearing aid as described hereinabove can also be employed in the manufacture of an ear plug as used with the behind-the-ear type of housing.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A hearing aid for insertion into the auditory canal of a user and having a plurality of components mounted therein, said hearing aid further comprising an outer shell that defines a plug that has an exterior configuration that has been preshaped to snugly fit into the auditory canal of the user's ear, an assembly including an outer member, an intermediate member and an innter member in which said components are mounted, said outer, intermediate, and inner members being preassembled together prior to being fixed in said shell and being interfitted together such that the connecting portions of the members are initially pivotally movable relative to each other to pre-shape the assembly into a configuration that generally corresponds to the configuration of the auditory canal of the user, and said outer shell being formed around said preshaped assembly to embed said assembly therein.

2. A hearing aid as claimed in claim 1, each of said members that comprise said preshaped assembly having a silicone type material located therein that is introduced into said members prior to the assembly of the members and after the components have been placed therein to permanently mount said components in position in the members.

3. A hearing aid as claimed in claim 2, the innermost end of said outer member being joined to the outermost end of said intermediate member, and the innermost end of said intermediate member being joined to the outermost end of said inner member, wherein said members are joined in end-to-end relation, said members being initially loosely joined to each other so as to facilitate pivotal movement thereof to a preshaped configuration, and means for locking said members in the preshaped position thereof prior to insertion into said hollow plug.

4. A hearing aid as claimed in claim 1, said outer member including a cover plate that includes a plate that is pivotally mounted thereon for enclosing a battery compartment and that is movable from a closed position to an open position on said cover plate to expose said battery for removal from said compartment.

5. A hearing aid as claimed in claim 4, said cover plate having a slot formed therein that is located in adjacent relation with respect to said pivotally mounted plate, said pivotal plate having a latch finger joined thereto that is frictionally receivable in said slot when said pivotal plate is moved to the closed position over said battery compartment, wherein said pivotal plate is located in latched relation on said cover plate.

6. A hearing aid as claimed in claim 1, said inner member having a projection formed on the innermost end thereof that has an interior passage formed therein, said inner member being formed with an interior chamber that communicates with said passage and that receives a sound tube that extends from said receiver therein, said sound tube having communication with said interior chamber and said passage.

7. A hearing aid as claimed in claim 6, said outer shell being formed by a quick setting acrylic material that encapsulates said members, an outer projection being formed on the lower most end of said outer shell and having a recess formed therein for receiving the projection of said inner member therein as said members are encapsulated in said shell to provide a means for positioning the assembled members during the encapsulating procedure, and a passage formed in the outer projection that communicates with the interior passageway as formed in the projection of said inner member wherein communication is provided between said sound tube and the auditory canal of the user when said plug is inserted therein.

* * * * *